(12) United States Patent
Smocha et al.

(10) Patent No.: US 6,694,288 B2
(45) Date of Patent: Feb. 17, 2004

(54) SYSTEM AND METHOD FOR AUTOMATED ANALYSIS OF LOAD TESTING RESULTS

(75) Inventors: Itzhak Smocha, Palo Alto, CA (US); Gideon Landan, Tel-Aviv (IL)

(73) Assignee: Mercury Interactive Corporation, Sunnyvale, CA (US)

( * ) Notice: Subject to any disclaimer, the term of this patent is extended or adjusted under 35 U.S.C. 154(b) by 0 days.

(21) Appl. No.: 10/214,421

(22) Filed: Aug. 6, 2002

(65) Prior Publication Data
US 2003/0074161 A1 Apr. 17, 2003

Related U.S. Application Data
(60) Provisional application No. 60/310,724, filed on Aug. 6, 2001.

(51) Int. Cl.[7] .............. G06F 11/30; G21C 17/00
(52) U.S. Cl. ............ 702/186; 702/176; 709/224; 714/47
(58) Field of Search .............. 702/108, 119, 702/122, 123, 176, 179–183, 186–188; 709/224; 714/43, 47

(56) References Cited

U.S. PATENT DOCUMENTS

| | | | | |
|---|---|---|---|---|
| 5,303,166 A | | 4/1994 | Amalfitano et al. ........ 702/186 |
| 5,446,874 A | | 8/1995 | Waclawsky et al. ........ 714/1 |
| 5,812,780 A | * | 9/1998 | Chen et al. ........ 709/224 |
| 5,964,891 A | * | 10/1999 | Caswell et al. ........ 714/31 |
| 6,108,700 A | | 8/2000 | Maccabee et al. ........ 709/224 |
| 6,138,157 A | | 10/2000 | Welter et al. ........ 709/224 |
| 6,157,618 A | * | 12/2000 | Boss et al. ........ 370/252 |
| 6,157,940 A | * | 12/2000 | Marullo et al. ........ 703/27 |
| 6,167,534 A | * | 12/2000 | Straathof et al. ........ 714/38 |
| 6,249,886 B1 | | 6/2001 | Kalkunte ........ 714/47 |
| 6,324,492 B1 | * | 11/2001 | Rowe ........ 703/13 |
| 6,434,513 B1 | * | 8/2002 | Sherman et al. ........ 702/186 |
| 6,446,120 B1 | * | 9/2002 | Dantressangle ........ 709/224 |
| 6,449,739 B1 | | 9/2002 | Landan ........ 714/47 |
| 6,457,142 B1 | * | 9/2002 | Klemm et al. ........ 714/38 |
| 6,470,464 B2 | * | 10/2002 | Bertram et al. ........ 714/37 |
| 6,477,483 B1 | * | 11/2002 | Scarlat et al. ........ 702/186 |
| 6,505,246 B1 | * | 1/2003 | Land et al. ........ 709/224 |
| 6,567,767 B1 | * | 5/2003 | Mackey et al. ........ 702/186 |
| 2002/0083371 A1 | * | 6/2002 | Ramanathan et al. ........ 714/37 |
| 2002/0138226 A1 | * | 9/2002 | Doane ........ 702/119 |
| 2002/0147942 A1 | | 10/2002 | Moe et al. ........ 714/38 |
| 2002/0198985 A1 | | 12/2002 | Fraenkel et al. ........ 709/224 |

* cited by examiner

Primary Examiner—Marc S Hoff
Assistant Examiner—Manuel Barbee
(74) Attorney, Agent, or Firm—Knobbe, Martens, Olson & Bear LLP (57) ABSTRACT

A system for monitoring and evaluating the performance of a network accessible application comprises one or more load servers, each of which is capable of simulating the load imposed upon the application server by one or more clients. The load servers are configured to execute a particular sequence of server requests in order to evaluate the operation of the server under the specified load. Various performance metrics associated with the operation of the network and the application server are measured during the testing of the server, and these metrics are stored for later access by an analysis module. The analysis module identifies those portions of the test data which are statistically significant and groups these significant parameters to suggest possible relationships between the conditions of the load test and the observed performance results.

44 Claims, 5 Drawing Sheets

SYSTEM AND METHOD FOR AUTOMATED ANALYSIS OF LOAD TESTING RESULTS

REFERENCE TO RELATED APPLICATIONS

This application claims priority benefit under 35 U.S.C. §119(e) from U.S. Provisional Application No. 60/310,724, filed Aug. 6, 2001, entitled "SYSTEM AND METHOD FOR AUTOMATED ANALYSIS OF LOAD TESTING RESULTS", which is hereby incorporated by reference herein in its entirety.

BACKGROUND OF THE INVENTION

1. Field of the Invention

The present invention relates to software tools for testing the performance of network applications, and more specifically to software tools for automating the analysis of the results of performance testing of networked applications.

2. Description of the Related Art

With the ever increasing availability of internet access, businesses have come to rely upon network communications, such as the internet, as a means of distributing information about their businesses, as a means of advertising, and in many cases, as a means of providing services to customers and potential customers. For certain businesses, for example those in the field of retail sales via the internet, internet presence is critical to the core operation of the business itself. Businesses which do not rely upon the internet to distribute information about themselves may still use networked systems in order to provide internal access to information within the company and in order to allow efficient cooperation between co-workers located at different sites.

In setting up networked systems, whether for internal use, or for availability via the internet, it is important to test the operation of the system and the applications which run upon it. Not only must the system respond properly to individual requests for information, but any network-available resource should also be capable of operating properly when being subjected to many simultaneous requests. In addition to operating correctly when subjected to multiple requests, it is desirable to determine the speed with which the system, such as a web server, responds to requests as the load upon the system increases. Such testing to determine the ability of such a system to respond under increasing amounts of traffic is referred to as load testing.

A variety of commercial systems exist to assist companies to perform both functionality and load testing of networked systems. Because of the importance of such networked systems, there is a continued need for improved tools for testing such systems, as well as for improved tools for analyzing the results of such testing.

SUMMARY OF THE INVENTION

Accordingly, one aspect of the system and methods described herein is to provide a system for monitoring various parameters of a network-accessible server over a period of time during which the server receives requests from one or more client applications, storing values representing these measured parameters in a location accessible to an analysis module, sending these values to the analysis module, identifying statistically significant patterns between various groups of values of these parameters, and using these patterns to suggest to a user likely causes for the identified patterns in the measured parameter values.

In another aspect, a method for automated load testing of a server is disclosed. A series of requests is made of the server by a client process or system, the series of requests and the number of requests being determined according to a testing profile. The performance of the server is measured during the time when the requests are sent to the server, and at least two different metrics associated with the performance of the server are measured during this time. The data representing the measured values of the performance metrics is stored along with an index indicating the time at which the measured performance metric value was taken. The data for each performance metric is analyzed in order to determine at least one significant portion of the data for each performance metric whose value is measured. The data from these significant portions is then compared for each pair of metrics measured, and a degree of correlation is determined for each pair of metrics. The data representing the correlation between the pair of metrics is then presented.

In a different aspect of the method disclosed herein, a method for analyzing the load on a server is described in which at least one client is configured to send a series of requests to a server, and a plurality of parameters of the server are measured during the period of time when the server receives the requests from the client. These values are stored in a series, and the time at which each value was measured is associated with each value. Correlations between the parameters are then identified based upon the stored series of values for the parameters, and those parameters which may be related to one another are selected based upon the correlation between the series of measured values for the parameters.

In an aspect of a system described herein, a load testing analysis system for identifying correlations between various performance parameters of a server comprises a server which is to be test and a communications medium through which requests may be sent to the server, and through which the server may reply to these requests. At least one client process sends a plurality of requests to the server through the communications medium, and a control console receives performance data from the server, the performance data corresponding to a plurality of performance metrics associated with the operation of the server. An analysis module is configured to correlate the data corresponding to the plurality of performance metrics in order to determine any relationship between any pair of the plurality of performance metrics.

BRIEF DESCRIPTION OF THE DRAWINGS

The invention will now be described with reference to the drawings summarized below. These drawings and the associated description are provided to illustrate a preferred embodiment of the invention, and not to limit the scope of the invention. Throughout the drawings, reference numbers are re-used to indicate correspondence between reference elements.

DETAILED DESCRIPTION OF THE PREFERRED EMBODIMENT

Throughout the description, reference will be made to various implementation-specific details. These details are provided to fully illustrate a specific embodiment of the invention, and not to limit the scope of the invention. The various processes described herein are preferably performed by using software executed by one or more general-purpose computers. The processes could alternatively be embodied partially or entirely within special purpose hardware without altering the fundamental system described.

In particular, a "module" as used herein, may refer to any combination of software, firmware, or hardware used to perform the specified function or functions. The modules described herein are preferably implemented as software modules, but may be represented partially or entirely in hardware or firmware. It is contemplated that the functions performed by these modules may also be embodied within either a greater or lesser number of modules than is described in the accompanying text. For instance, a single function may be carried out through the operation of multiple modules, or more than one function may be performed by the same module. The described modules may be implemented as hardware, software, firmware or any combination thereof. Additionally, the described modules may reside at different locations connected through a wired or wireless network, or the Internet.

Overview

Figure 1:
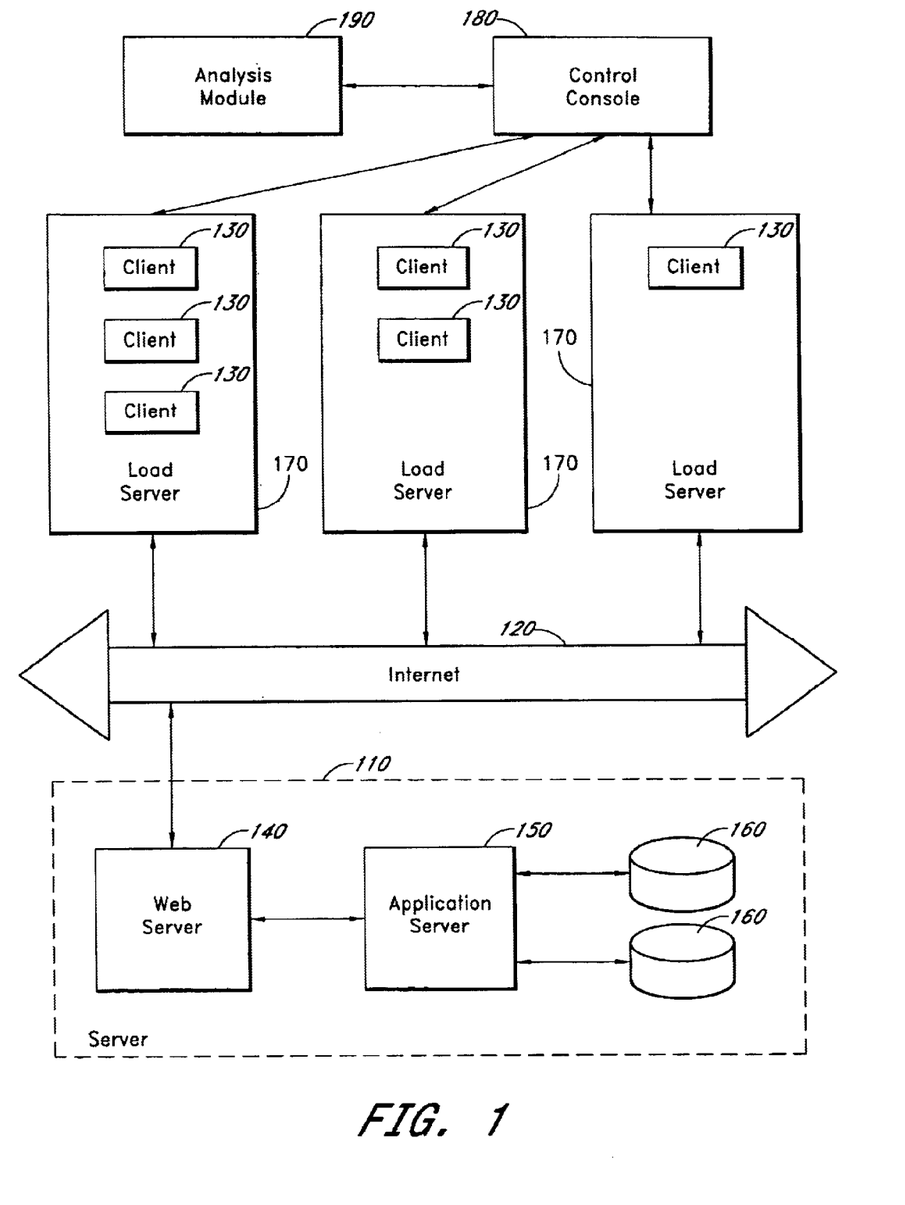
FIG. 1 illustrates a high-level block diagram of one embodiment of a system for performing automated load testing and analysis.

FIG. 1 shows one exemplary embodiment of a system for performing load testing of a networked information system. The illustrated system is a client/server system in which requests are made by clients of a server and information is sent back to the clients from the server. The load testing which is performed can generally be used to test the responsiveness of a particular server (as discussed below), as well as to test the connections between the clients and the server. Because any test input to the server must pass along the network, the network is effectively part of each test to the extent that network problems will show up as problems in the responsiveness of the server. However, by analyzing the data produced during load testing, network related bottlenecks can be identified and separated from any actual problems associated with the operation of the server itself. This will be discussed in greater detail below.

As shown in FIG. 1, the server 110 is connected to a communications medium in order for the server 110 to communicate with any clients. The illustrated communications medium is the internet 120. Various clients 130 connect through the communications medium to the server 110. Each client 130 may represent an individual user of the system under actual use, or may, as will be discussed below, represent a virtual client which is simulating the behavior of an individual user for testing purposes. In addition to the system shown in FIG. 1, in which the load testing is performed remotely over the internet (e.g. using a hosted load testing service), it is also possible to perform load testing using a local network upon which both the tested server 110 and the clients 130 reside. In this instance, an in house or other private network may have the appropriate load testing software loaded onto particular computers and run locally upon the network. This latter arrangement may be particularly advantageous for pre-deployment testing of servers 110 or other systems for which it is desirable to not expose the tested system 110 to the internet 120 prior to the completion of testing.

As shown in FIG. 1, the server 110 undergoing testing may comprise a number of sub-components. These may include a web server 140, an application server 150, and one or more databases 160. The web server 140 handles incoming requests from clients 130 and presents an interface to a client of the system for interacting with the server 110. The application server 150 processes the requests made of the server 110 which are passed to it by the web server 140. The databases 160 store information related to the operation of the application server 150, and provide it to the application server. Although the system under test 110 illustrated in FIG. 1 is a web-based server system, the described system and techniques are also applicable to other types of network-based multi-user systems, which may communicate using a variety of networking and communications protocols.

In one embodiment of the system as described herein, the server being tested may represent a web server or other system designed to be communicated with via HTTP (HyperText Transport Protocol), or a variant thereof. This web server may be configured to output display pages formatted using HTML (HyperText Markup Language) encoded web pages for display by a client program such as a web browser.

As used herein, the terms, "web server", "application server", and "database" may refer to a process being run on a computer or other hardware which carries out a specific function, or may refer to the system upon which this function is performed. Those of skill in the art will recognize that despite being shown as separate elements in FIG. 1, the web server 140, application server 150, and databases 160 may be run on one or more machines as is appropriate to the function being performed. For instance, for small scale operations, it may be reasonable to run the application server 150 and the database 160 as separate processes on a single computer. Larger operations may require multiple databases 160 run on separate computers to support a single application server 150 running on still another computer. Variations in such internal architecture of the server 110 do not substantially alter the nature of the system described herein.

Also shown in FIG. 1 are a number of load servers 170. A load server is a computer which supports one or more virtual clients 130. In ordinary operation of a client/server system, the amount of load on the server 110 is directly related to the number of individual client processes simultaneously making requests of the server 110. In such ordinary circumstances, each client process represents a single user interacting with the server. However, in order to perform load testing, it is desirable for the load to be generated without requiring a large number of individual users to be working simultaneously, and also to not require a large number of individual computers acting as clients to the server 110.

To accomplish this, each load server 170 simulates the behavior of one or more clients 130, and sends and receives information to and from the server 110 as if were a number of individual clients. By using virtual clients 130 running upon load servers 170, it is possible for a smaller number of load servers 170 to generate a load upon the server which is equivalent to the load generated by a larger number of individual users during ordinary use.

A control console 180 links to each load server 170 and governs the operation of the load servers. The control console may comprise a computer or other hardware executing a program that allows a user overseeing the load testing to configure the operation of each load server, including the type and number of virtual clients 130 for each load server to simulate, as well the timing of the load testing. The control console may also allow a user to view the results of the load testing, and monitor the operation of the testing as it is performed.

An analysis module 190 may also be connected to the control console 180. The analysis module 190 may be run on a separate computer system which has access to the results of the load tests performed by the control console 180, or may simply be a separate software module which runs upon the same system as the control console 180. The analysis module 190 may also be run on a load server 170. Such an arrangement may be particularly advantageous when only a single load server 170 is used for the test session.

The analysis module 190 may perform automated analysis of the results of one or more load test sessions in order to present information indicating various ways in which the configuration of the server 110 may be optimized, or to determine the performance bottlenecks of the server 110.

Although not shown in FIG. 1, it will also be understood that other components may be used in this system both in addition to, or in place of some of the components shown. For example, routers and switches will handle the data as it passes between the various load servers 170, the server 110, and the internet 120. Firewalls may also be located between various systems to protect individual systems from undesirable access being made via a connection to the internet 120 or another connecting communications medium. Similarly, load balancers may be used to properly handle traffic throughout the system, and various storage devices may be used.

Furthermore, although direct connections are shown between individual systems, such as between the control console 180 and the load servers 170, those of skill in the art will recognize that the internet 120 or a similar communications medium may be used to connect all of the systems shown in FIG. 1 together. The connections shown in FIG. 1 represent the flow of data rather than physical connections between the systems shown.

Testing

As mentioned above, each client 130 makes requests of the server 110, and receives information back from the server. When performing automated testing, it is desirable to configure the virtual clients 130 to make various requests in the same manner as actual clients would, but without the local overhead associated with user interaction. Two types of simulation that may be used for most client/server applications include a playback technique and a simulated interface.

Using a playback technique, it is possible to simulate a client by recording and playing back a series of direct calls to the server such as would be made by an actual client without running the actual client process. In this way, the server performs the same operations that would be performed if such requests were being made by a full client. However, the client being used to perform the playback need not actually do all of the local processing normally associated with making those server calls; they can simply be sent at the appropriate times and then wait until the response to the server call is received. Such a system may also measure the delay until the response is received, although those of skill in the art will recognize that appropriate software on the server may also monitor the delay between the receipt of a request and the sending of a response. The difference between the delay as measured by the client and the delay as measured by the server is always the time the messages spent in transit between the client and server.

The simulated interface method involves preparing an interface, such as would be used by a client being used to access the server, and then simulating the operation of that interface on the local system and allowing the calls which would be made via that simulated client interface to be made to the server. Although such a technique involves actual simulation of the interface used by the client program, there is no need to display the interface or otherwise cause the actual interface to be shown as it would to a user. By appropriate simulation, it is therefore possible to allow multiple simultaneous client processes to be simulated on a single load server (as discussed below), without the need to display or operate a number of user-operable client processes on the load server system.

The user may configure each individual virtual client 130 on each load server 170 to carry out certain tasks and make particular requests of the server 110. By setting up different sequences of operations for the clients 130, the user may present the server with a load which simulates whatever type of user population is desired. When simulating a gaming server, for instance, it might simply be desirable to simulate 50 clients all connected and sending requests consistent with the playing of the same network game. However, in simulating an online merchant's typical traffic, the virtual clients could be configured to send messages which corresponded to the server traffic expected when there were 100 users simultaneously browsing the merchant's web site, 10 users simultaneously making purchases, and 5 users simultaneously reviewing their account histories. By allowing different virtual clients to have different types of server requests, a more accurate modeling of the user population may be created for use with the server for testing.

The virtual clients 130 may also be configured to incorporate delays to simulate the time a user spends responding to each bit of new information presented, as well as to wait for particular times or events before proceeding, in order that a large load may be applied to the server all at once. Such behavior will also allow the test session to be configured to most precisely simulate the load on the server to be tested.

Once the individual clients 130 have been configured, and each load server is set up to simulate as many virtual clients as desired, a test session may be initiated. During a test session, each load server 170 runs its virtual clients 130 and interacts with the server 110. A single session may be ended by reaching the end of the programmed test profile, by user intervention, or by the server 110 crashing.

In an exemplary test session, the server 110 being tested is subjected to a series of client requests from the virtual clients 130 generated by the various load servers 170. As the test session runs, the load, as represented by the number of client requests made of the server 110, is increased. Throughout the run, various measurements are recorded by both the virtual clients 130 and the server 110, and these measurements are sent back to the control console 180, where they are recorded. The measurements can represent a variety of performance metrics, referred to as 'monitors'. These monitors can include, without limitation: the response time for a client transaction, the number of successful transactions per second by the server, the number of failed transactions per second, the total throughput of the server 110, and such other measurements as would be known to one of skill in the art.

A single test session may run a specific set of test patterns on specified load servers 170, or may be configured to continue to increase the load upon the server 110 until such time as the server 110 is unable to handle further load and crashes. In either event, a set of results are collected from the each test session. These results may comprise one or more series of measurements of monitor values as indicated above, each measurement paired with the time corresponding to the measurement.

This data is collected and stored for later access by the analysis module, described below. Those of skill in the art will recognize that the data need not be stored on the control console 180 itself, but might be stored in any repository which is accessible to the control console 180 and analysis module 190, and which can be written to from the load servers 170 and such other systems or processes that measure the values of the various performance monitors.

Multiple test sessions may be run, and the monitor data saved from each. In addition, test sessions may be run using various configurations, and the data from each different test session sent to the same console 180. These varying configurations may include differences in network configuration, such as router or firewall settings, or changes in network topology. Other types of varied configurations may include changes in the number of individual client processes 130 that are used in the test, or in the profile of the requests made by the clients. Still further variations may include the type of request being made of the server by the clients.

Additional details of components and testing methods that may be used to load test the information system 110 are set forth in U.S. patent application Ser. No. 09/484,684, filed Jan. 17, 2000, and Ser. No. 09/565,832, filed May 5, 2000, the disclosures of which are hereby incorporated by reference.

Performance Analysis

The monitor data collected in an individual test session may be made available from the control console 180, or from any other system which captures and stores this data, to the analysis module 190. For example, in addition to monitor data collected as described above, monitor data may also be read from other sources of performance measurements. For instance, if monitor data is available from the internal logging feature of a program, such as a database server, this data may also be read and integrated into the body of data being analyzed in the analysis module.

The monitor data from each source may be passed along to the analysis module in real time, or may be stored and forwarded at a later time to the analysis module 190. The analysis module 190 may also receive data from multiple control consoles 180 responsible for different test sessions of one or more servers 110. The data may also be made available to the analysis module 190 upon a request from the analysis module 190 to one of the various control consoles 180 or other systems which store such data. Those of skill in the art will recognize that the nature of the analysis is not changed by the manner in which the data is received by the analysis module 190.

As mentioned above, the data received by the analysis module 190 may desirably comprise a series of measurements paired with a time stamp corresponding to such time within the test session at which that measurement was taken. Because each measurement of a monitored value is indexed to a particular time stamp within a particular test session, it is possible to associate the values of one monitor with those of another monitor taken at the same time. By aligning those monitors which represent simultaneous measurements, the relationships between the various monitors may be determined.

Figure 2A:
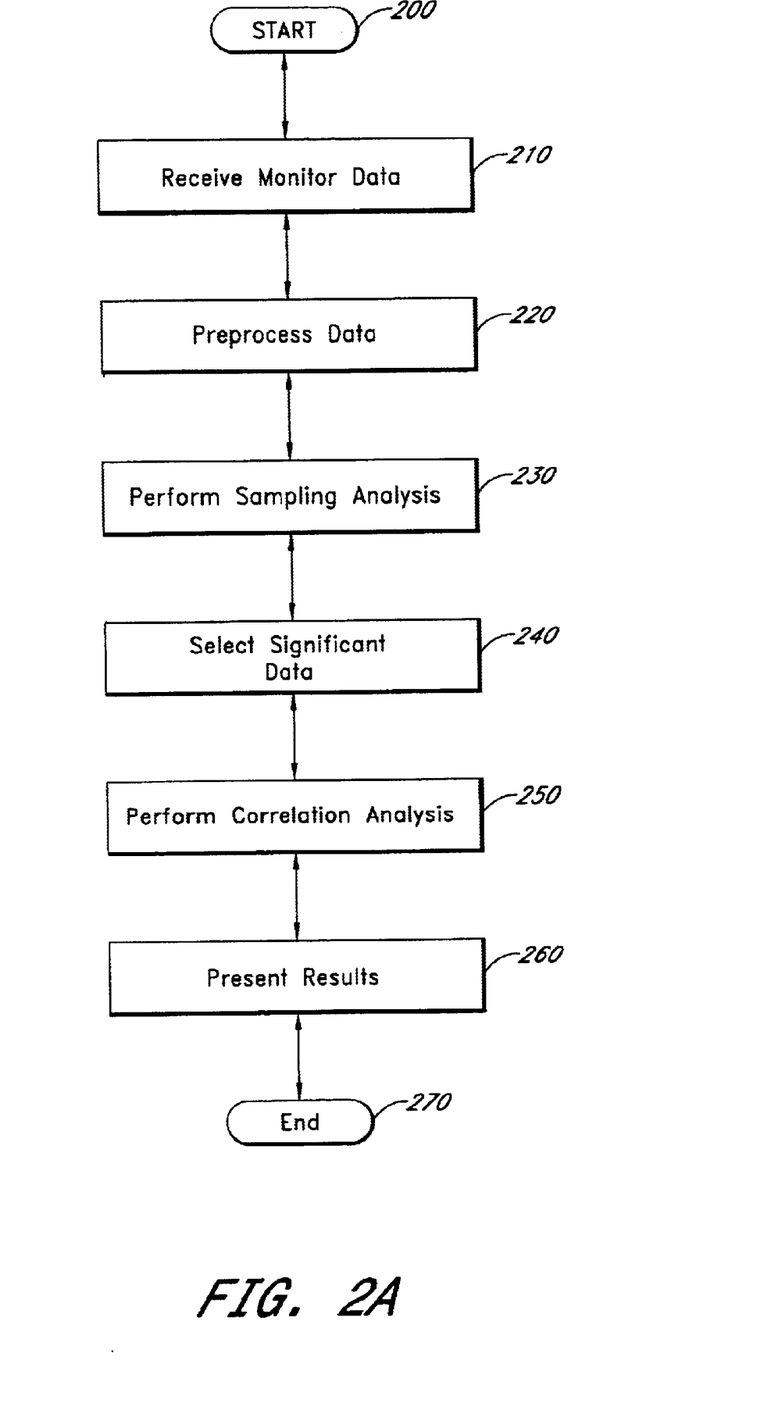
FIG. 2A illustrates a sample process flow identifying the steps involved in performing analysis of measured data.

After the analysis module 190 has received the data for the monitored values and time stamps, as shown in FIG. 2A at step 210, the analysis module 190 may desirably be configured to perform various types of statistical analysis of the data provided by the tests of the server 110. This analysis may include descriptive statistics which help identify general trends in the data, detection of suspicious or incomplete test results, analysis of correlations between monitors and within a single monitor over time, and profiling of each monitor's behavior over time with respect to other monitored values. Those of skill in the art will recognize that many different forms of statistical analysis are possible in addition to those described above. Some of the various types of statistical analysis which may be performed individually or in combination by the analysis module 190 are described below with reference to FIG. 2A.

Preprocessing

A preliminary step which may desirably be performed before performing any further analysis is to preprocess the data produced. Such a step is shown as 220 in FIG. 2A. Preprocessing may involve filling in any missing values, such as values that can be inferred based upon boundary conditions, as well as those values which may be reliably interpolated based upon surrounding data.

For instance, in order to perform appropriate analysis on the response time of the server based upon the load imposed upon the server, it is desirable to know the load imposed for each time index at which a server response time has been measured. Because the number of clients in operation at any given time, and hence the load upon the server, is determined by the profile of the test session, it is possible to determine what the load was for each time index for which a response time was measured. By interpolating and filling in the data in this and other ways, a series of monitor values or other measurements each associated with a time index can be prepared. Such data may be represented in a variety of ways; however, as discussed herein, the data will be considered to be a series of monitor values, each of which is paired with the appropriate time index representing the time at which that monitor value was measured.

In addition, values which are clearly outside the range of normal values may be deleted if they reflect degenerate or otherwise improper data. For instance, if a percentage measurement is returning values less than zero or greater than one-hundred percent, these values may be eliminated as representing data which is not meaningful.

Sampling Analysis

After the data has been preprocessed (220), the sampling of the data is analyzed (230). In the sampling analysis (230), the data associated with a set of monitor measurements is examined as a population to determine how meaningful it is. This sampling analysis is generally performed independently for each of the monitor values recorded. For instance, monitors corresponding to server transactions executed per second, server load (in requests per second), and average response time for each request may each have been monitored during a test session. The sampling analysis can be performed independently for each of these three variables, however.

One type of sampling analysis is whether or not the data shows any trends over the course of a test session. Data which indicates that a particular monitor always returns the same value or nearly the same value is less likely to be informative than data which shows that a monitor changes consistently over time. Constant or nearly constant data does not show a strong relation between any activity of the test and the monitored value. Such data is detected and flagged for the user. By identifying such uninformative monitors, more effective testing can be performed in future sessions by configuring the test sessions to avoid tracking uninformative monitors. Furthermore, such constant results are not generally significant in a statistical sense, and will not result in a correlation with any of the varied test parameters, and so further analysis of constant or near-constant monitor generally does not lead to meaningful results.

Another sampling analysis technique involves examining the monitor data to determine whether or not there are sufficient values for a particular monitor to provide a statistically significant analysis of the results. One way to determine whether sufficient sampling has taken place is simply to use a cutoff value requiring a minimum number of measured data points for further analysis. Such a number may be set by the user when making a request of the analysis module 190, or may simply be set by default to a particular value, such as 25 measurements over the course the test session.

Other types of sampling analysis which may be desirable include identification of the overall pattern reflected by the samples taken. For instance the sampling pattern may indicate that the data was recorded at uniform time intervals, or that the data was recorded in groups of measurements separated by longer intervals with little or no data measured, or that the data was recorded randomly over time. The identification of the particular pattern of sampling during the test session will allow a more directed analysis to be performed.

A given set of test session data may be divided into segments based upon the changes identified via the sampling analysis. For instance, a single test session might indicate a first period of time where the average response time per request is constant at a first level, a second period of time where the average response time is increasing, and a third period of time where the average response time is constant at a second level. Such data can be divided into three separate time segments, each representing a period where the sampled behavior was different from the other segments. However, within each segment, the monitored values fell within the same sampling pattern. By breaking the test session data into such segments, transition points between these segments can be identified for each monitor, representing the time index at which the behavior of the particular monitor changed.

The user may use this information to identify the particular portions of the test data which he would like to analyze (step 240). When this analysis is performed, the analysis module 190 may recommend to the user the range of data which appears to be significant based upon its sampling characteristics. In alternative technique, the analysis module 190 may proceed with further analysis of those portions of the data which are calculated to have the most significance. By examining the data between such transition points, segments of data which appear to be less significant, as discussed above, can be separated from more meaningful data.

In either circumstance, the sampling analysis allows for further analysis to be directed specifically to that portion of the data which will produce more meaningful results. By avoiding undersampled or poorly sampled portions of the data, the analysis module 190 skips the segments of the test data where the monitored data is not statistically significant and does not reflect useful data. By identifying such limitations of the monitor data, the analysis module 190 is able to process those segments of the data which are meaningful and will produce better results and correlations.

Alternatively, the analysis module 190 may request additional data from any control console 180 or other repository of monitor data to which it has access. If this data is available, it may be transferred to the analysis module 190 and used to provide further data points for the analysis being performed to improve its statistical significance.

Correlation Analysis

Once the significant portions of the data are determined (240), either by the user selection, after suggestion based upon the sampling analysis (230), or automatically by the analysis module 190, these portions of the data are analyzed to find the correlations between any pair of monitors in a test segment, as indicated in step 250 of FIG. 2A. For instance, the corresponding values for the number of transactions per second at the server 110 may be compared with the response time of the system 110 as seen by the client at the same moment. Such pairs may be produced for all pairs of monitored values across a particular test session or across a set of test sessions.

In order to produce appropriate data corresponding to meaningful data points, it may be necessary to resample the data for particular pairs of monitor data. For example, in order to produce appropriate data points to analyze, appropriate interpolated values may be produced using such techniques as are known in the art, including, but not limited to: integration, averaging, and linear interpolation. Such techniques can be used to provide estimates of the appropriate monitor data for time points in the test session at which there is not an actual recorded value of the monitor in question. In particular, this may be advantageous when one monitor has been sampled at one rate, and another has been sampled at another rate.

For instance, if the number of server transactions per second was measured every 5 seconds, and the average response time to a server request was measured every 10 seconds, it may be desirable to generate appropriate data for the average response time on an every 5 second basis by interpolating the available data points. Similarly, if both measurements were taken every 10 seconds, but they are out of phase with one another, it may be desirable in some circumstances to resample the data such that the resampled data for both monitors have the same time indexes.

In addition, based upon the transition points between the various time segments for the monitors, the analysis module 190 can identify monitors in which the transition points correspond roughly to the transitions in other monitors, but are offset by a small amount. By looking for such corresponding but offset transitions, monitors which appear to be related may be identified and selected for further analysis. In an additional mode, the pairwise data for any two monitors having such an offset may be adjusted by the offset so as to more closely correlate the appropriate monitor data.

This may occur when there is a natural lag between the imposition of a particular condition upon the server being tested, and the results of that change. For example, adding additional virtual users to the test may cause the response time of the server to go up. However, if the response time tends not to increase until such time as a memory cache is filled, there may be a lag between an increase in the number of users and the increase in response time. However, both monitors may demonstrate transition points that are roughly consistent, but are offset by the amount of time it takes for the cache to fill. By analyzing the offset between these transition points, an appropriate offset may be applied when performing resampling in order to correlate these two monitors values.

Correlation coefficients can then calculated for the pairs of monitored data. The coefficient chosen may desirably comprise a Pearson correlation coefficient, or may be a coefficient of determination. These and such other coefficients as known to those of skill in the art are useful in identifying those monitors which show behavior related to other monitors in the test session data.

The correlations may also be subjected to cluster analysis in order to produce a tree showing those monitors which represent data which appear to be similar in a significant way. Cluster analysis may be performed in a variety of ways known to those of skill in the art, such as by grouping data based on the statistical distance between adjacent points in the set. Various clustering and classification algorithms are known in the art, and one or more of these may be applied to locate monitors demonstrating significantly similar behavior.

The correlations may be used to identify monitors which track each other extremely closely, those which exhibit no relation, and those which exhibit related, but not identical behavior. This information may then be presented to the user as an indication of those monitors which appear to represent the same piece of information (those which track each other closely), those which are unrelated (those which exhibit small or zero correlation), and those which may represent functional and causal relationships (those which have significant, but not extremely high, correlations).

Such analysis may be made by graphically presenting the data, or may be made by calculating a numerical correlation coefficient associated with the pair of monitors, as mentioned above. The correlation coefficients may be calculated in a variety of ways known to those of skill in the art. A pair of threshold correlation coefficient values may be assigned for use in determining the most significant pairs of monitors to examine. It may be advantageous to have a different set of threshold values for different types of correlation coefficients. An upper threshold, for example, a 90% correlation coefficient, may be set such that any pair of monitors exhibiting a greater correlation than this threshold are considered to represent the same underlying data. Conversely, a lower threshold, for instance 20%, may be set such that any pair of monitors exhibiting a lesser correlation are assumed to be unrelated.

By identifying these monitor pairs which appear to be nearly completely correlated and those which appear to be nearly completely unrelated, those pairs of the most interest may thereby be separated. The pairs which are of most interest are generally those which show a high degree of correlation, but which do not correlate so completely as to represent redundant trends. This is because monitors with extremely high correlations tend to simply be different ways of measuring the same underlying phenomenon.

For instance, server response time as measured by the client and server response time as measured by the server will tend to differ by a small amount corresponding to the delay for the message to be sent from the client to the server and back. While this delay may vary during the operation of the test, if the delay never varies too much, these two monitored values will tend to have a very high correlation coefficient. However, such a perfect match between these values tells the operator nothing about the effectiveness of their system.

If, on the other hand, the server response time as measured by the client did vary in some significant way from the response time as measured by the server, there might be a significance to such data. For instance, if the response time as measured by the client tended to go up significantly more quickly than the response time as measured by the server, this might represent a bottleneck of some kind in the network. As these values diverge more, their correlation coefficient will tend to decrease, indicating a potentially greater significance to the data. Those pairs of monitors which have values falling between the threshold coefficients will tend to be those which are of most interest to someone analyzing the test results.

By performing this analysis, it is possible for the analysis module 190 to draw conclusions about monitors which appear to identify related behavior. If such a relation is statistically significant, it may represent a dependency or causal connection. By pointing out such correlations to a user, the analysis module 190 enables the user to more easily identify those aspects of the server 110 and system as a whole which appear to have an effect upon performance as measured by the monitored values. This may lead to identification of bottlenecks or weaknesses in the structure of the system.

For instance, if a strong correlation is detected between the time required to respond to a single transaction, and the number of simultaneous transactions, this may indicate that there is not enough memory or other capacity on the application server 150 to handle requests while additional requests are being received. By contrast, if individual transactions are handled quickly, but many transactions simply fail, this may indicate a problem with throughput in the web server 140 or along the network pathways.

Such identification of correlated measurements allows the user to more quickly identify those aspects of the operation of the server 110 which are most dependent on the conditions under which the server 110 operates. By identifying these dependencies, the user may reconfigure the server 110 in order to improve the reliability and efficiency of the server, as well as to alter future test sessions to produce more meaningful test results.

After the correlation analysis is performed (250), the results may be displayed to the user (260) in a variety of ways, one example of which is described below and shown in FIGS. 2B to 4, and discussed further below.

Operation

In one embodiment, the user initially requests analysis of some particular monitor from the analysis module 190. The analysis module 190 then retrieves the data for that monitor from the available sources, which may include one or more control consoles 180, one or more repositories of existing test session results, and any outside monitor data sources (such as automated logging for the server) which may be available. The user may also specify one or more specific sources from which monitor data is to be retrieved. Once the necessary data is received (210), the analysis module 190 preprocesses (220) the data as described above.

Once the data is in a form with which it may be analyzed in detail, the analysis module conducts sampling analysis (230) and determines what segments of the available data may be significant (240) and useful for further correlation analysis (250). In an additional mode, the analysis module 190 may be configured to determine what additional types of data would be required in order to perform further analysis and either request these automatically from the appropriate repositories, such as control consoles 180. The module may also include such information in its report to the user.

Figure 3:
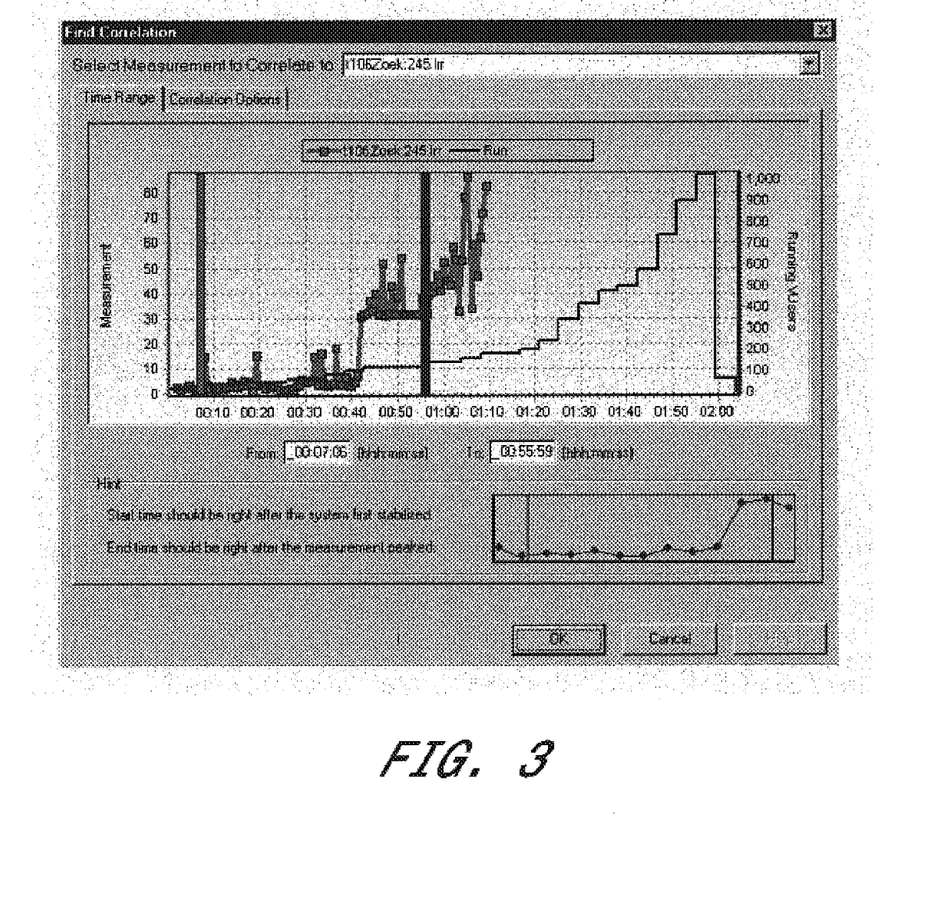
FIG. 3 illustrates a sample screen showing a selection of a portion of the test session data from FIG. 2A for analysis.
Figure 4:
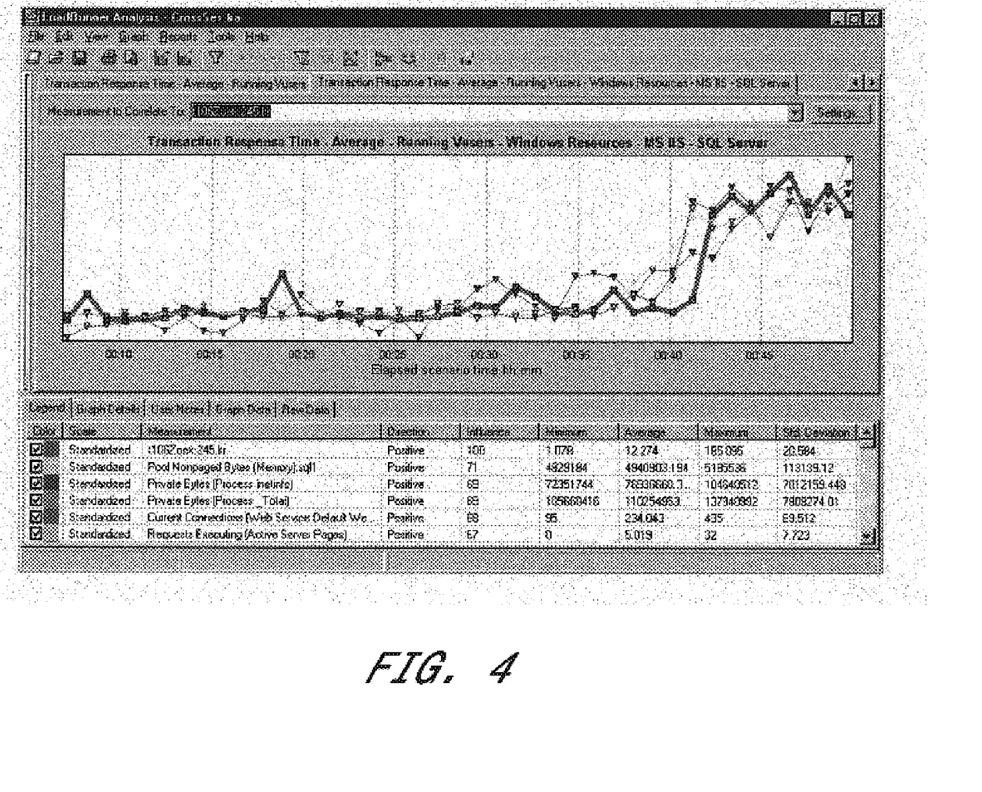
FIG. 4 illustrates a sample screen showing a range of monitored values which have varying correlations with the selected monitored data of FIG. 3.

Once the analysis is performed, the results are presented to the user (260). This may be done using graphical techniques, such as dendograms, scattercharts, graphs of related monitors versus time, and such other presentations as are known to those of skill in the art. One exemplary set of user interface screens is shown in FIGS. 3 and 4 and described below. In embodiments in which the analysis module 190 is provided as a hosted service, the various graphs and charts may be presented as web pages over the internet, or may be created and stored for later access.

Figure 2B:
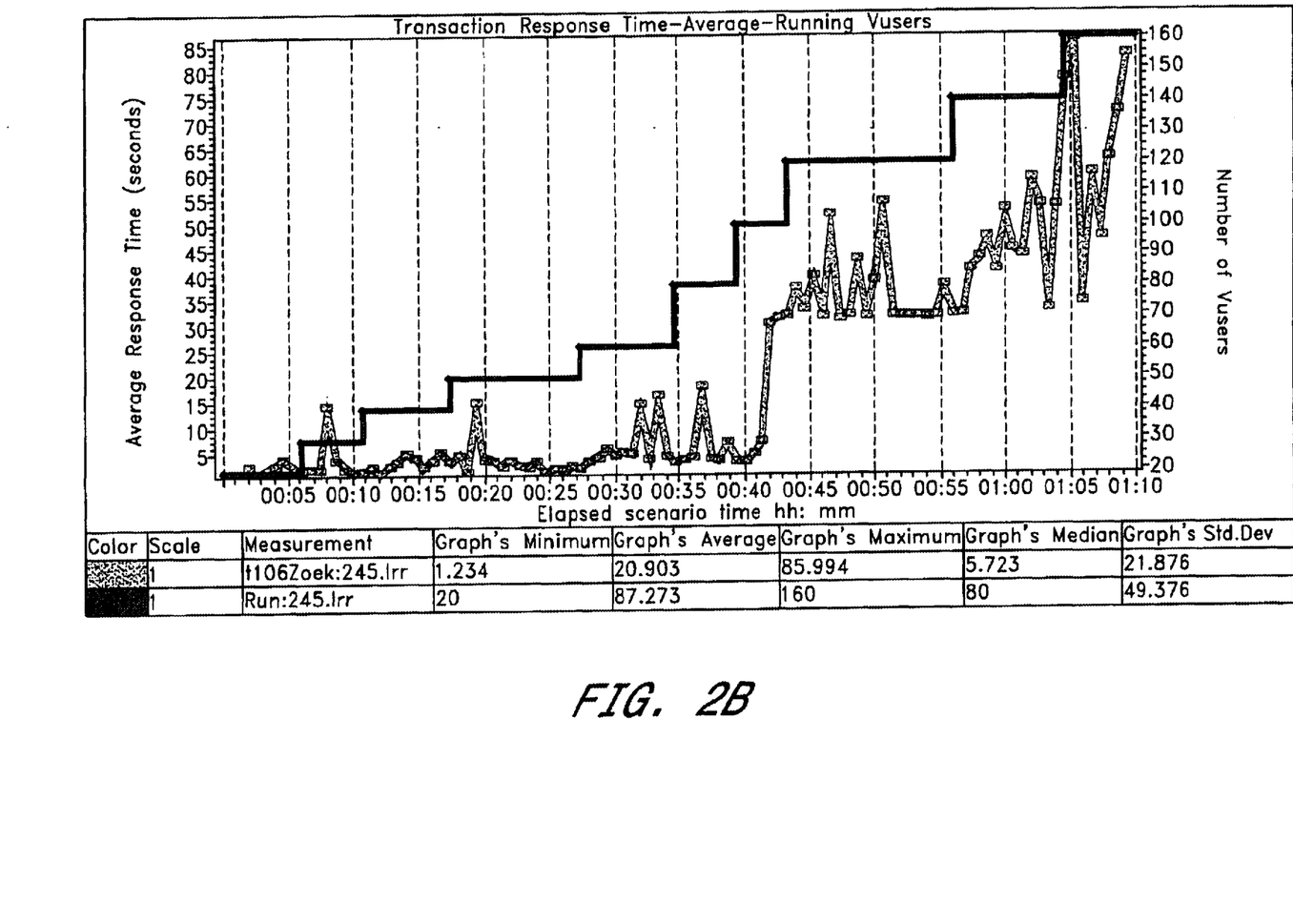
FIG. 2B illustrates a sample display showing a basic plot of a pair of monitored values from a test session.

The sample display shown in FIG. 2B shows a basic graph of the number of virtual clients 130 taking part in a test session graphed along with the average response time of the server 110 to each of a particular type of server request. This graph represents the most basic presentation of two monitors in graphical form. The data presented has already been preprocessed. The sampling properties of the data may also be shown in this graph, and each individual data point measured is represented as a single point joined to the next measured value by a line.

When presented with such a graph, the user may choose to select a smaller region of the test session shown to further analyze for correlations. The selection of such a region of the overall graph is shown in FIG. 3. Once the appropriate portion of the test session is selected, the user may either choose a specific type of analysis to perform, or may allow the analysis module 190 to proceed with automated analysis of the selected region.

FIG. 4 shows one way to present the correlation analysis of the selected region. The original monitor chosen is shown superimposed with the other monitor data which correlates most significantly with it. In addition to the graph, the statistics which lead to the selection of these monitors as being the most significantly correlated are shown in a chart below the graph. More data is available by clicking upon the tabs shown above the chart.

It will be recognized that a browser may also be used to display output pages generated by the analysis module 190 if the pages are generated in HTML format. Such pages may be sent directly to a browser or other module, such as the control console 180, for immediate display, or may be stored for later access by a user.

It is to be understood that not necessarily all objects or advantages of the system described above may be achieved in accordance with any particular embodiment of the system. Thus, for example, those skilled in the art will recognize that the invention may be embodied or carried out in a manner that achieves or optimizes one advantage or group of advantages as taught herein without necessarily achieving other objects or advantages as may be taught or suggested herein.

Although this invention has been disclosed in the context of certain preferred embodiments and examples, it therefore will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above.

What is claimed is:

1. A method for analyzing the performance of a server under load, the method comprising:
   providing at least one client configured to send a series of requests to a server;
   measuring a plurality of parameters of the server over the period of time during which the server receives requests from the at least one client;
   storing a series of values representing these measured parameters;
   associating a time at which each value was measured with each stored value;
   identifying correlations between the measured parameters based upon the stored values for the parameters, wherein identifying the correlations comprises calculating a correlation coefficient between the series of values for one parameter and the series of values for another parameter; and
   selecting parameters which may be related to one another based upon the correlation between the measured values of the parameters.

2. The method of claim 1, wherein selecting parameters which may be related comprises comparing the correlation coefficient associated with a pair of parameters to a lower threshold value and selecting the pair of parameters if the correlation coefficient is greater than the lower threshold value.

3. The method of claim 1, wherein calculating a correlation coefficient between the series of values comprises calculating a Pearson correlation coefficient.

4. The method of claim 1, further comprising applying a clustering algorithm to said correlations to group together parameters that represent similar behavior.

5. The method of claim 1, further comprising generating a tree which shows parameters that, based on a clustering analysis, are deemed to demonstrate similar behavior.

6. The method of claim 1, wherein identifying correlations between the measured parameters comprises detecting an offset in time between a transition point of a first monitor and a transition point of a second monitor.

7. The method of claim 1, further comprising performing a sampling analysis of a series of values of a selected parameter to identify a significant portion of said series of values of said selected parameter.

8. The method of claim 1, further comprising applying a re-sampling method to a series of values of a first parameter to facilitate a comparison with a series of values of a second parameter.

9. The method of claim 8, wherein applying the re-sampling method comprises generating interpolated values for said first parameter.

10. The method of claim 1, wherein selecting parameters which may be related to one another comprises determining whether a pair of parameters are so closely correlated to be deemed to merely represent redundant information.

11. The method of claim 1, wherein measuring the plurality of parameters comprises measuring said parameters over a time period in which a controlled load is applied to the server.

12. The method of claim 1, wherein measuring the plurality of parameters comprises measuring said parameters over a time period in which a load on said server is controllably increased.

13. The method of claim 1, further comprising displaying to a user graphs representing measurements of first and second parameters over time, and providing to the user an option to select a region of said graphs on which to perform an automated correlation analysis.

14. The method of claim 1, further comprising presenting to a user a graph of selected parameters that are deemed to be related to each other, together with numerical data indicating why the selected parameters were selected as being related.

15. The method of claim 1, wherein identifying correlations between the measured parameters comprises analyzing data values for at least the following types of parameters: (a) server transactions executed per unit time, (b) server load, and (c) server response time.

16. A method for analyzing the performance of a server under load, the method comprising:
   providing at least one client configured to send a series of requests to a server;
   measuring a plurality of parameters of the server over the period of time during which the server receives requests from the at least one client;
   storing a series of values representing these measured parameters;
   associating a time at which each value was measured with each stored value;
   identifying correlations between the measured parameters based upon the stored values for the parameters, wherein identifying correlations comprises performing a sampling analysis on each series of values in order to identify significant portions thereof and selecting parameters which may be related to one another based upon the correlation between the measured values of the parameters.

17. The method of claim 16, wherein identifying correlations further comprises comparing a significant portion of a first series of values to a significant portion of a second series of values in order to determine a correlation between the first series and the second series.

18. The method of claim 16, wherein performing the sampling analysis comprises evaluating whether collected parameter values exhibit a statistically significant trend.

19. The method of claim 16, wherein performing the sampling analysis comprises identifying at least one parameter that is deemed uninformative.

20. The method of claim 16, wherein performing the sampling analysis comprises determining whether a sufficient number of values have been collected for a given parameter to perform a statistically significant analysis.

21. The method of claim 16, wherein performing the sampling analysis comprises evaluating whether measurement values for different parameters correspond sufficiently in time.

22. The method of claim 16, wherein performing the sampling analysis comprises identifying at least one segment of time for which data values collected for said parameters are sufficient for performing a statistically meaningful correlation analysis.

23. The method of claim 16, further comprising dividing the series of measurement values into multiple statistically significant segments based on said sampling analysis, each segment representing a different period of time.

24. The method of claim 16, further comprising identifying to a user segments of parameter data that are deemed to be significant, and providing to the user an option to perform an automated correlation analysis of said segments.

25. The method of claim 16, wherein identifying the correlations comprises generating correlation coefficients for selected pairs of parameters.

26. The method of claim 16, wherein measuring the plurality of parameters comprises measuring said parameters over a time period in which a controlled load is applied to the server.

27. The method of claim 16, wherein measuring the plurality of parameters comprises measuring said parameters over a time period in which a load on said server is controllably increased.

28. The method of claim 16, wherein performing the sampling analysis comprises analyzing data values of at least the following types of parameters: (a) server transactions executed per unit time, (b) server load, and (c) server response time.

29. A system for facilitating the analysis of a server system, comprising:

a data collection component that collects sequences of data values of each of a plurality of performance metrics reflective of the performance of a server system; and an automated analysis component that analyses the sequences of data values, and generates correlation coefficients for specific pairs of the performance metrics, to identify monitors that are related, to thereby facilitate identification of causal relationships that affect server performance.

30. The system of claim 29, wherein the automated analysis component evaluates whether a pair of performance metrics are related by comparing a correlation coefficient associated with the pair to a threshold value.

31. The system of claim 29, wherein the automated analysis component calculates Pearson correlation coefficients for the pairs of performance metrics.

32. The system of claim 29, wherein the automated analysis component uses a clustering algorithm to group together performance metrics that are deemed related.

33. The system of claim 29, wherein the automated analysis component generates a tree indicating performance metrics that, based on a clustering analysis, are deemed to demonstrate similar behavior.

34. The system of claim 29, wherein the automated analysis component detects offsets in time between transition points in a pair of performance metrics.

35. The system of claim 29, wherein the automated analysis component performs a sampling analysis on the sequences of measurement values to identify significant portions of said sequences.

36. The system of claim 35, wherein the automated analysis component performs the sampling analysis at least in-part by evaluating whether collected performance metric values exhibit a statistically significant trend.

37. The system of claim 35, wherein the automated analysis component further identifies performance metrics that, based on the sampling analysis, are deemed uninformative.

38. The system of claim 35, wherein the automated analysis component performs the sampling analysis at least in-part by determining whether a sufficient number of values of a given performance metric have been collected to perform a statistically meaningful analysis.

39. The system of claim 35, wherein the automated analysis component performs the sampling analysis at least in-part by evaluating whether measurement values for different performance metrics correspond sufficiently in time.

40. The system of claim 35, wherein the automated analysis components divides sequences of measurement values into multiple statistically significant segments based on said sampling analysis, each segment representing a different period of time.

41. The system of claim 29, wherein the automated analysis component identifies a segment of time for which collected data values of the performance metrics are sufficient for performing a statistically meaningful correlation analysis.

42. The system of claim 29, further comprising a user interface component that displays graphs representing sequences of data values of selected performance metrics, and provides a user option to select portions of said graphs on which to apply an automated correlation analysis.

43. The system of claim 29, wherein the data collection component collects, and the automated analysis component analyzes, data values of each of the following types of performance metrics: (a) server transactions executed per unit time, (b) server load, and (c) server response time.

44. The system of claim 29, further comprising a component that enables a user to control a load applied to the server system during collection of the data values by said data collection component.

* * * * *